US012804478B2

(12) United States Patent
Roy et al.

(10) Patent No.: US 12,804,478 B2
(45) Date of Patent: Nov. 17, 2026

(54) WIRELESS NETWORK AND METHODS FOR HANDLING PDU SESSION HANDOVER ADMISSION CONTROL IN WIRELESS NETWORK

(71) Applicant: Samsung Electronics Co., Ltd., Suwon-si (KR)

(72) Inventors: Koustav Roy, Bangalore (IN); Arijit Sen, Bangalore (IN); Danish Ehsan Hashmi, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/691,603

(22) PCT Filed: Oct. 6, 2022

(86) PCT No.: PCT/KR2022/015043
§ 371 (c)(1),
(2) Date: Mar. 13, 2024

(87) PCT Pub. No.: WO2023/059096
PCT Pub. Date: Apr. 13, 2023

(65) Prior Publication Data
US 2024/0397390 A1 Nov. 28, 2024

(30) Foreign Application Priority Data
Oct. 6, 2021 (IN) ............................. 202141045548
Sep. 21, 2022 (IN) ............................ 2021 41045548

(51) Int. Cl.
*H04W 4/00* (2018.01)
*H04W 36/00* (2009.01)

(52) U.S. Cl.
CPC . *H04W 36/00222* (2023.05); *H04W 36/0027* (2013.01)

(58) Field of Classification Search
CPC ........... H04W 76/15; H04W 36/00222; H04W 76/34; H04W 76/22; H04W 76/11;
(Continued)

(56) References Cited

U.S. PATENT DOCUMENTS 10,582,432 B2 * 3/2020 Park ................ H04W 36/00837
11,490,326 B2 11/2022 Yu et al.
(Continued)

FOREIGN PATENT DOCUMENTS

KR 10-2284316 B1 7/2021

OTHER PUBLICATIONS

NEC, TS23.501 Correction to the NSAC for signaling optimization, S2-2105668, 3GPP TSG SA WG2 Meeting #146-e, Aug. 10, 2021, Elbonia.
(Continued)

*Primary Examiner* — Phuoc H Doan
(74) *Attorney, Agent, or Firm* — Jefferson IP Law, LLP

(57) ABSTRACT

The disclosure relates to a 5G or 6G communication system for supporting a higher data transmission rate. Embodiments herein disclose methods for handling a network slice admission control (NSAC) performed by a Network Function (NF) service consumer (200) in a wireless network (1000). The method includes determining that an existing Protocol Data Unit (PDU) session has been handed over from a source access to a target access. Further, the method includes performing a network slice admission control for the PDU session, based on the determination, by interacting the NF service consumer with a Network Slice Admission Control Function (NSACF) entity (300).

6 Claims, 8 Drawing Sheets

(58) Field of Classification Search
CPC ............. H04W 36/0064; H04W 28/24; H04W 36/0027; H04W 36/14; H04W 48/18; H04W 88/14; H04W 88/16
See application file for complete search history.

(56) References Cited

U.S. PATENT DOCUMENTS

| | | | | |
|---|---|---|---|---|
| 2024/0348667 | A1* | 10/2024 | Hong | H04L 41/0894 |
| 2025/0008422 | A1* | 1/2025 | Hong | H04W 48/18 |

OTHER PUBLICATIONS

Lenovo et al., Completion of NSAC per access type, S2-2106345, 3GPP TSG SA WG2 Meeting #146-e, Aug. 10, 2021, Elbonia.
LG Electronics, Resolving the editor's note on session continuity in EPC Interworking scenario, S2-2105488, 3GPP TSG SA WG2 Meeting #146-e, Aug. 10, 2021, Elbonia.
Ericsson et al., Roaming support for NSAC, S2-2103803, 3GPP TSG SA WG2 Meeting #145-e, May 10, 2021, Elbonia.
3rd Generation Partnership Project; Technical Specification Group Core Network and Terminals; Non-Access-Stratum (NAS) protocol for 5G System (5GS); Stage 3; (Release 17), 3GPP TS 24.501 V17.6.0, Mar. 24, 2022.
3rd Generation Partnership Project; Technical Specification Group Core Network and Terminals; 5G System; Network Slice Admission Control Services; Stage 3 (Release 17), 3GPP TS 29.536 V1.1.0, Feb. 1, 2022.
Qualcomm Incorporated, New SID on Study of Further Architecture Enhancement for UAV and UAM, S2-2105860, 3GPP TSG SA2 Meeting #146E (e-meeting), Aug. 27, 2021, Elbonia.
Indian Office Action dated Aug. 10, 2023, issued in Indian Application No. 202141045548.
International Search Report dated Jan. 12, 2023, issued in International Application No. PCT/KR2022/015043.

* cited by examiner

WIRELESS NETWORK AND METHODS FOR HANDLING PDU SESSION HANDOVER ADMISSION CONTROL IN WIRELESS NETWORK

TECHNICAL FIELD

Embodiments disclosed herein relate to wireless communication networks, and more particularly to methods and the wireless communication networks for handling network slice admission control (NSAC) in the wireless communication network.

BACKGROUND ART 5G mobile communication technologies define broad frequency bands such that high transmission rates and new services are possible, and can be implemented not only in "Sub 6 GHz" bands such as 3.5 GHZ, but also in "Above 6 GHZ" bands referred to as mm Wave including 28 GHZ and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A Network Slice Admission Control Function (NSACF) (300) (aka "NSACF entity") updates a current number of User Equipment's (UEs) (100) registered for a Single Network Slice Selection Assistance Information (S-NSSAI), i.e. increases or decrease a number of UEs registered per network slice based on information provided by an Access and Mobility Management Function (AMF) (aka "AMF entity") (500).

An SMF+PGW-C (200*a*) interacts with the NSACF (300) to increase or decrease Number of Protocol Data Unit (PDU) Sessions per network slice (S-NSSAI).

The NSACF (300) is the entity which performs network slice admission control and keeps track of the number of PDU sessions and when threshold is reached it will indicate to a Session Management Function (SMF) that PDU session establishment is not allowed.

For NSACF to act and count properly, the SMF is required to keep informing the NSACF (300) that new PDU session establishment is requested. When this request is received, the NSACF increases the count of PDU sessions and if threshold is not reached then the SMF is informed that the PDU session establishment is allowed.

As per the prior art, the trigger in the SMF to interact with the NSACF (300) to check the threshold and increase the count of PDU session is only during PDU session establishment procedure (initial establishment), its assumed that once PDU session is already established (existing PDU session) there is no need to interact with the NSACF (300). Even though the UE go to long-term evolution (LTE), go from a LTE to a Fifth-generation system (5GS) or a 5GS to a LTE or the PDU session is handed over from one access (e.g. 3GPPA) to another (e.g. non-3GPP access), change the registration area etc. This was fine because even though the UE (100) is mobile between Radio access technologies (RAT's)/access type or changes the registration area the PDU session context is maintained thus there is no need for a trigger at the SMF to interact with the NSACF (300). But there is a problem in this approach as illustrated in FIG. 1

FIG. 1 depicts an example scenario, where the UE (100) registers on the 3GPP and the non-3GPP. At step 0, suppose the NSACF (300) has the initial count P0, U0 for the PDU session count and the number of registered UE(s) per network slice for NSSAI1 on the 3GPP access and count P1, U1 for the PDU session Count and Number of registered UE(s) per network slice for NSSAI1 on the non-3GPP access. At step 2, the AMF (500) will interact with the NSACF (300) to increase the number of registered UE(s) per network slice. After step 2, the NSACF (300) will increase the number of registered UEs per network slice. The NSACF (300) will also create the associated NF ID from where the request have come (in this case, AMF (500)). For S-NSSAI1, the NSACF (300) will have below information:

NSSAI1:—{{3GPP Access, {UE ID1, NF for Number of Registered UE per network slice {NF_AMF}}, {P0, U0+1}}

At step 4, the AMF (500) will interact with the NSACF (300) to increase the number of registered UE(s) per network slice. After step 4, the NSACF (300) will increase the number of registered UEs per network slice. The NSACF (300) will also create the associated NF ID from where the request have come (in this case AMF (500)). For S-NSSAI1, the NSACF (300) will have the below information:

NSSAI1:—{{3GPP Access, {UE ID1, NF for Number of Registered UE per network slice {NF_AMF}}, {P0, U0+1}}, {{non-3GPP Access, {UE ID1, NF for Number of Registered UE per network slice {NF_AMF}}, {P1, U1+1}}, At step 5, PDU session establishment is initiated by the UE, after step 6, the NSACF (300) will increase the number of registered PDU sessions per network slice on the 3GPP access. The NSACF (300) will also create the associated NF ID from where the request has come (in this case, the SMF (200*b*)). For S-NSSAI1, the NSACF (300) will have the below information:

NSSAI1:—{{3GPP Access, {UE ID1, NF for Number of Registered UE per network slice {NF_AMF}, {UE ID1, PID1 {P0+1, U0+1}}, {{non-3GPP Access, {UE ID1, NF for Number of Registered UE per network slice {NF_AMF}}, {P1, U1+1}}, After step 7, the SMF (200*b*) will not have any interaction with the NSACF, so the stored value at the NSACF (300) will remains the same as below information:

"NSSAI1:—{{3GPP Access, {UE ID1, NF for Number of Registered UE per network slice {NF_AMF}, {UE ID1, PID1}, {P0+1, U0+1}}, {{non-3GPP Access, {UE ID1, NF for Number of Registered UE per network slice {NF_AMF}}, {P1,U1+1}}"

For the illustration, S-NSSAI1 is subject to NSAC and information stored in NSACF (300) as below:

S-NSSAI1:

{{Access type,

NF for Number of Registered UE per network slice: {UE ID, {NF ID, NF ID . . . }, {UE ID2, {NF ID, NF ID2 . . . }.

NF for Number of PDU session per network slice: {UE ID, PDU session ID1, PDU session ID2 . . . ,}.

Number of PDU session Count, Number of registered UE count}}

There is no interaction of the SMF+P-GW-C (200*a*) with the NSACF (300) because it's an existing PDU session. However this count can be enhanced to be managed per access type. The NSACF (300) can be configured if the network slice admission control has to be applied for the 3GPP access type, non-3GPP access type or to both the accessess. Thus if the PDU session is handed over from one access type (e.g., 3GPP access type) to another access type (e.g., non-3GPP access) if there is no interaction with the NSACF (300) then the NSACF (300) will maintain the wrong count of PDU sessions per access type and will lead to unintended consequences. For example consider below example, 1. Suppose PDU session count in the NSACF (300) for S-NSSAI X for 3GPP access and non-3GPP access respectively are P0-3GPP and P0-non-3GPP.
2. The UE (100) on the 3GPP access established new PDU session with S-NSSAI-x. The NSACF (300) updated with PDU session count as P0-3GPP+1, Po-non-3GPP
3. The UE (100) handover PDU session of the S-NSSAI from 3GPP to non-3GPP as per the prior art, the SMF doesn't perform interaction with the NSACF (300) so that the PDU session count in the NSACFF (300) is not update and it remains P0-3GPP+1, Po-non-3GPP.
4. As the count is not update for 3GPP and non-3GPP access. Other UE will face admission control. For an example, another UE try to establish PDU session over 3GPP access with S-NSSAI-x, it may not be admitted if maximum allowed PDU session for S-NSSAI is set to P0-3GPP+1. Similar issue can be inferred when UE handover PDU session from non-3GPP access to 3GPP access It is desired to solve this issue or at least provide alternate way of handling the described problem statement.

DISCLOSURE OF INVENTION

Technical Problem

Prior art misses the point that NSACF maintains the PDU session count per access type. Thus if PDU session is handed over from one access type (3GPP access type) to another access type (non-3GPP access) if there is no interaction with NSACF then NSACF will maintain the wrong count of PDU sessions per access type and will lead to unintended consequences.

Solution to Problem

Accordingly, the embodiments herein provide methods for handling a NSAC performed by a Network Function (NF) service consumer in a wireless network. The method includes determining that an existing Protocol Data Unit (PDU) session has been handed over from a source access to a target access. Further, the method includes performing a network slice admission control for the PDU session, based on the determination, by interacting the NF service consumer with a NSACF entity.

In an embodiment, performing the network slice admission control for the PDU session comprises increasing a number of PDU session for the target access, and in case that the increasing the number of PDU session for the target access is successful, decreasing a number of PDU sessions for the source access.

In an embodiment, the source access is a 3rd Generation Partnership Project (3GPP) and the target access is a non-3GPP access.

In an embodiment, the source access is a non-3GPP access and the target access is a 3GPP access.

In an embodiment, the NF service consumer includes one of a Session Management Function (SMF) entity or a combined SMF and Packet Data Network Gateway (PGW-C).

Accordingly, the embodiments herein provide NF service consumer for handling a network slice admission control (NSAC) in a wireless network. The NF service consumer includes a NSAC controller coupled with a processor and a memory. The NSAC controller determines that an existing PDU session has been handed over from a source access to a target access. Further, the NSAC controller performs a network slice admission control for the PDU session, based on the determination, by interacting the NF service consumer with a Network Slice Admission Control Function (NSACF) entity.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

Embodiments of the present disclosure provides methods and apparatus for triggering SMF to interact with NSACF to perform network slice admission control, when SMF determines existing PDU session is handed over from non-3GPP access to 3GPP access or 3GPP access to non-3GPP access.

Therefore, PDU session management can be performed accurately and accordingly, unintended consequences that could have occurred in prior art can be prevented.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

MODE FOR THE INVENTION

Figure 1:
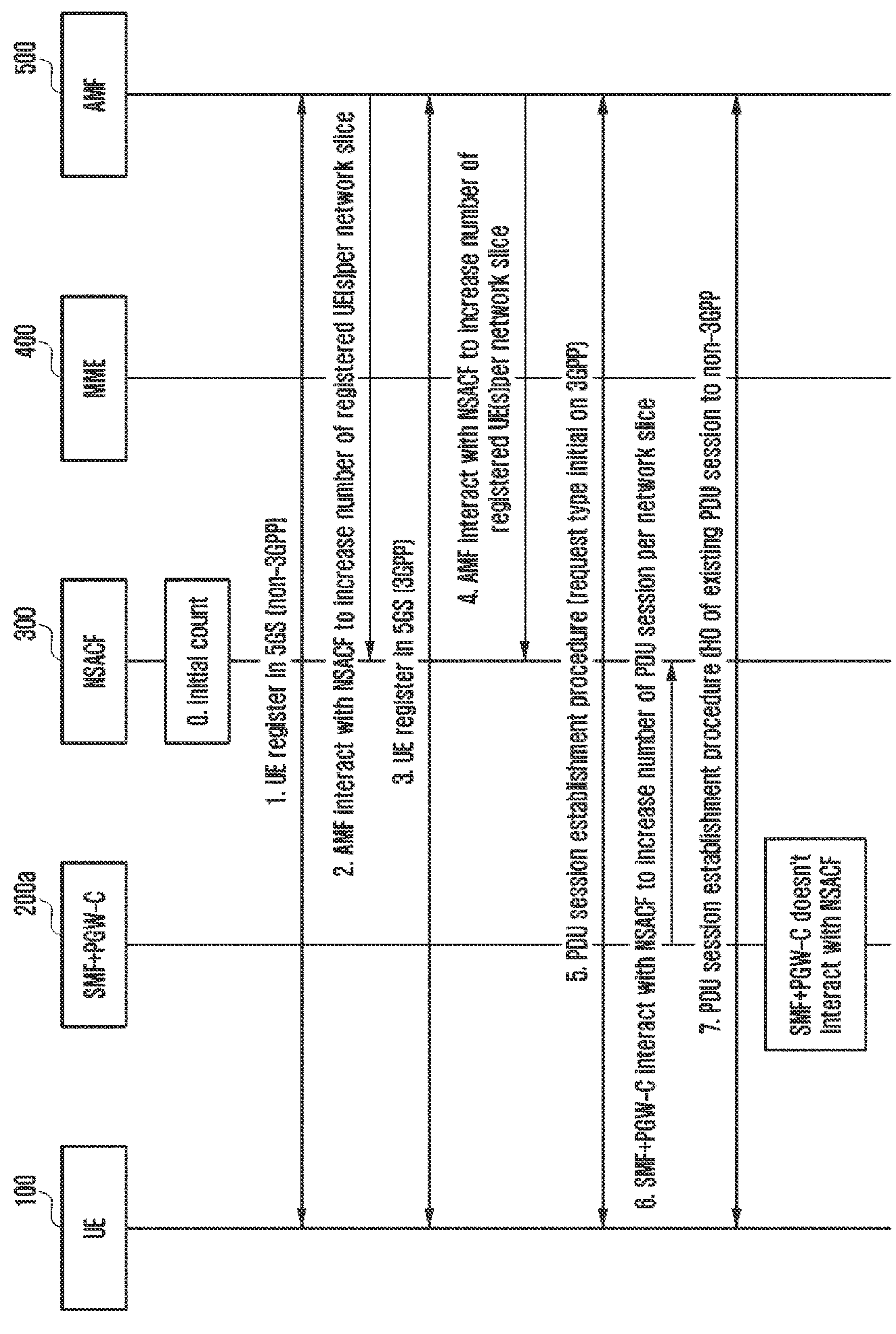
FIG. 1 depicts an example scenario in which a UE registers on a 3GPP and a non-3GPP, according to prior arts.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for handling a NSAC in a wireless network. The method includes determining, by a NF service consumer, that an existing PDU session has been handed over from a source access to a target access. Further, the method includes updating, by the NF service consumer, a count at the source access and a count at the target access, based on the determination, by interacting the NF service consumer with a NSACF entity.

In an embodiment, if a request type is "existing PDU session", a SMF entity shall not perform network slice admission control for the PDU session, except for the following cases such as handover of an existing PDU session between a 3GPP access and a non-3GPP access is performed. In an embodiment, the NF service consumer (e.g. SMF, combined SMF+PGW-C or the like) shall invoke a NumOfPDUsUpdate service operation to request the NSACF entity to perform network slice admission control procedure related to a number of PDU sessions by using HTTP POST techniques.

The following abbreviations have been used herein:

a) NSAC: Network Slice Admission Control,
b) NSACF: Network Slice Admission Control Function,
c) AMF: Access and Mobility Management Function,
d) NEF: Network Exposure Function,
e) NF: Network Function,
f) NSSAI: Network Slice Selection Assistance Information,
g) NSSF: Network Slice Selection Function,
h) S-NSSAI: Single Network Slice Selection Assistance Information,
i) SMF: Session Management Function,
j) UPF: User Plane Function,
k) EPC: Evolved Packet Core Network,
l) EPS: Evolved Packet System,
m) MME: Mobility Management Entity,
n) PGW-C: Packet Data Network Gateway, The prior art does not disclose the point that the NSACF maintains the PDU session count per access type. Thus, if the PDU session is handed over from one access type (e.g., 3GPP access type) to another access type (e.g., non-3GPP access) if there is no interaction with the NSACF then the NSACF will maintain the wrong count of PDU sessions per access type and will lead to unintended consequences. For example consider below example, 1. Suppose PDU session count in the NSACF for S-NSSAI X for 3GPP access and non-3GPP access respectively are P0-3GPP and P0-non-3GPP.
2. UE on 3GPP access established new PDU session with S-NSSAI-x. NSACF updated with PDU session count as P0-3GPP+1, Po-non-3GPP
3. UE handover PDU session of S-NSSAI from 3GPP to non-3GPP as per the prior art, SMF doesn't perform interaction with NSACF so PDU session count in the NSACFF is not update and it remains P0-3GPP+1, Po-non-3GPP As the count is not update for 3GPP and non-3GPP access. Other UE will face admission control. For an example, another UE try to establish PDU session with S-NSSAI-x, it may not be admitted if maximum allowed PDU session for S-NSSAI is set to P0-3GPP+1. Similar issue can be inferred when UE handover PDU session from non-3GPP access to 3GPP access. The current arts does not handle above scenarios. The proposed method overcomes the problem of the current arts.

Referring now to the drawings, and more particularly to FIGS. 2 through 8, where similar reference characters denote corresponding features consistently throughout the figures, there are shown at least one embodiment.

Figure 2:
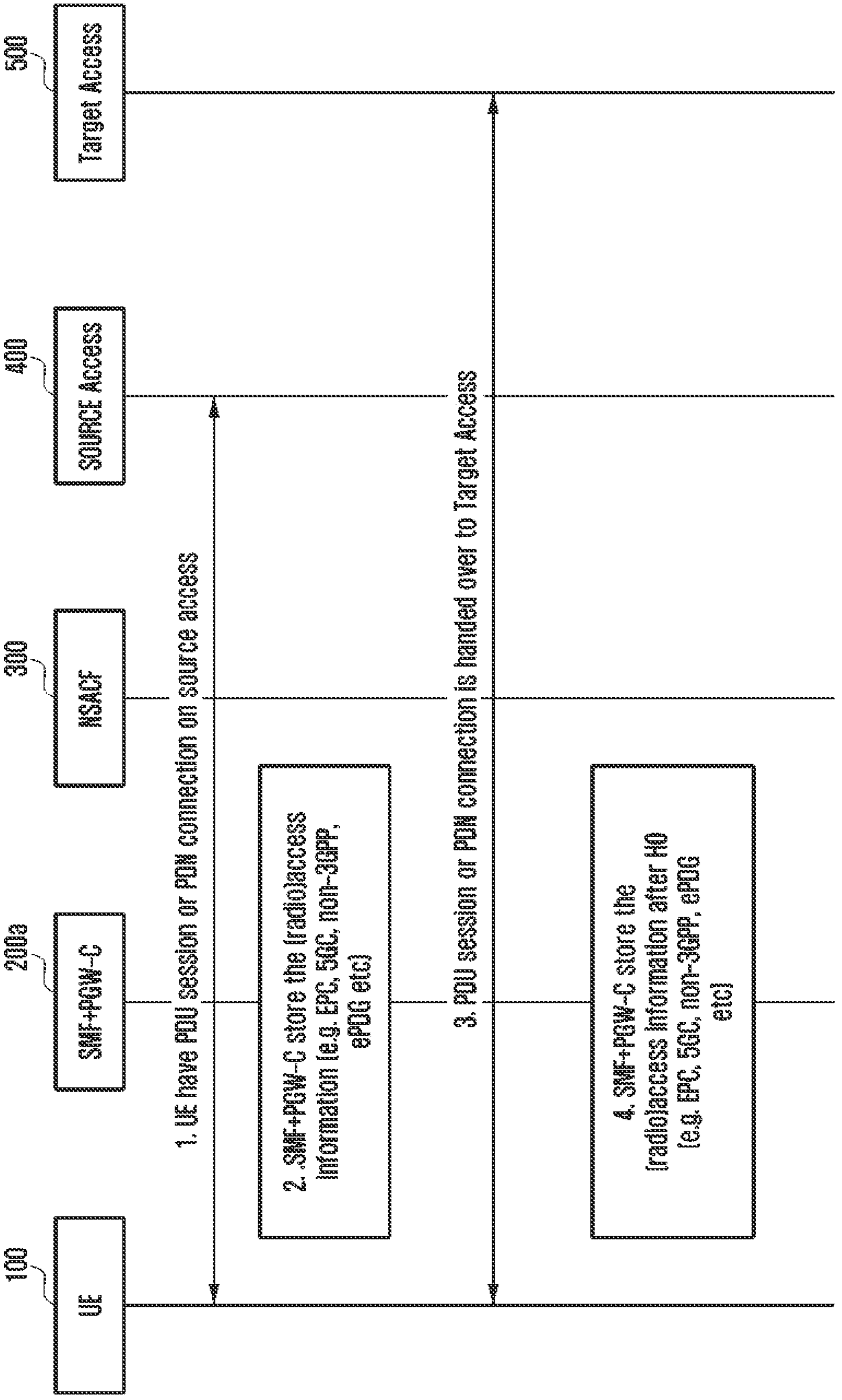
FIG. 2 depicts a method for handling PDU and PDN session handovers in wireless communication networks, according to embodiments as disclosed herein.

FIG. 2 depicts a method for handling PDU and PDN session handovers in the wireless communication networks (1000), according to the embodiments as disclosed herein. The SMF+PGW-C (200*a*) takes the below action, in case of PDU session/PDN connection is handover over from one access to other access:

Case1: The source access is the non-3GPP and the target access is the 3GPP (5GC)

A) The SMF (200*b*) or the SMF+PGW-C (200*a*) interacts with the NSACF (300) to decrease number of PDU session per network slice for the non-3GPP access.

B) The SMF (200*b*) or the SMF+PGW-C (200*a*) interact with the NSACF (300) to increase number of PDU session per network slice for the 3GPP access.

Case2: The source access is 3GPP (5GC) and the target access is the non-3GPP.

A) The SMF (200*b*) or the SMF+PGW-C (200*a*) interacts with the NSACF (300) to decrease number of PDU session per network slice for the 3GPP access.

B) The SMF (200*b*) or the SMF+PGW-C (200*a*) interacts with the NSACF (300) to increase number of PDU session per network slice for the non-3GPP access.

For case 1 and case 2, if the SMF (200*b*) or the SMF+PGW-C (200*a*) identified the PDU session transfer between the 3GPP and the non-3GPP (based on the saved access information in step A and/or B), it interacts with the NSACF (300) to decrease the number of PDU sessions per network slice on the source access and increase the number of PDU session per network slice on the target access.

Case3: Source access is an EPC and the target access is the non-3GPP.

If the SMF+PGW-C (200*a*) is configured with "EPC counting required",

A) the SMF (200*b*) or the SMF+PGW-C (200*a*) interacts with the NSACF (300) to decrease number of PDU session per network slice for the 3GPP access.

B) the SMF (200*b*) or the SMF+PGW-C (200*a*) interacts with the NSACF (300) to increase number of PDU session per network slice for the non-3GPP access.

C) The SMF (200*b*) or the SMF+PGW-C (200*a*) interacts with the NSACF (300) to decrease number of registered UE(s) per network slice for the 3GPP access.

Case 4: The source access is non-3GPP and the target access is EPC if the EPC counting is required, A) the SMF (200*b*) or the SMF+PGW-C (200*a*) interacts with the NSACF (300) to decrease number of the PDU session per network slice for the non-3GPP access.

B) The SMF (200*b*) or the SMF+PGW-C (200*a*) interacts with the NSACF (300) to increase number of PDU session per network slice for the 3GPP access.

C) the SMF (200*b*) or the SMF+PGW-C (200*a*) interacts with the NSACF (300) to increase number of registered UE(s) per network slice for the 3GPP access if the EPC counting is not required, A) the SMF (200*b*) or the SMF+PGW-C (200*a*) interacts with the NSACF (300) to decrease number of the PDU session per network slice for the non-3GPP access Case 5: the source access is the EPC and the target access is 5GC (3GPP)

If the EPC counting is required,

A) the SMF (200*b*) or the SMF+PGW-C (200*a*) interacts with the NSACF (300) to decrease number of registered UE(s) per network slice for the 3GPP access or B) If the SMF+PG-C (200*a*) identified that PDN connection with PDU session ID is completely moved to other access (in this case 3GPP access), interact with NSACF (300) to decrease number of registered UE(s) per network slice for the 3GPP access.

Case 6: the source access is the EPC and the target access is 5GC (3GPP)

if EPC counting is not required,

A) SMF (200*b*) or SMF+PGW-C (200*a*) interact with NSACF (300) to decrease number of PDU session per network slice for the 3GPP access if EPC counting is required, A) SMF (200*b*) or SMF+PGW-C (200*a*) interact with NSACF (300) to decrease number of registered UE(s) per network slice for the 3GPP access For all solutions, if the PDN connection is successfully handover to other access (e.g., 5GC or non-3GPP), SMF+PGW-C (200*a*) which is configured with "EPC Counting required", interact with NSACF (300) to decreases the number of registered UEs per network slice for the S-NSSAI which is handed over to the other access.

When the PDN connection is handed over/reselected to target access (e.g., 5GC or non-3GPP) or the target RAT (EPS or 5GS), if the SMF+PGW-C (200*a*) is configured with "EPC counting required", the source SMF+PGW-C (200*a*) interact with NSACF (300) to decreases the number of registered UEs per network slice/number of PDU sessions for the S-NSSAI, which is handed over to target access or target RAT.

When the PDN connection is handed over/reselected to the target access (e.g., 5GC or non-3GPP) or the target RAT EPS or 5GS), if the SMF+PGW-C (200*a*) is configured with "EPC Counting required", the target SMF+PGW-C (200*a*) interact with NSACF (300) to increases the number of registered UEs per network slice/number of PDU sessions for the S-NSSAI which is handed over to target access or target RAT.

When the PDN connection is handed over/reselected to target access (e.g., 5GC or non-3GPP) or the target RAT (EPS or 5GS), if the SMF+PGW-C (200*a*) is configured with "EPC Counting is not required", the source SMF+PGW-C (200*a*) interacts with the NSACF (300) to decreases the number of registered UEs per network slice/number of PDU sessions for the S-NSSAI,s which is handed over to target access or target RAT When the PDN connection is handed over/reselected to the target access (e.g., 5GC or non-3GPP) or target RAT (EPS or 5GS), if the SMF+PGW-C (200*a*) is configured with "EPC Counting is not required", the target SMF+PGW-C (200*a*) interact with the NSACF (300) to increases the number of registered UEs per network slice/number of PDU sessions for the S-NSSAI which is handed over to target access. The source and target in above embodiments can be the same node, but they act as two different virtual nodes from the protocol perspective.

As shown in the FIG. 2, at step 1, the UE (100) have the PDU session or the PDN connection on the source access. At step 2, the SMF+PGW-C (200*a*) stores the (radio) access information (e.g. EPC, 5GC, non-3GPP, ePDG etc.). At 3, the PDU session or the PDN connection is handed over to the target access. At 4, the SMF+PGW-C (200*a*) stores the (radio) access information (e.g. EPC, 5GC, non-3GPP, ePDG etc.) after the HO.

Figure 3:
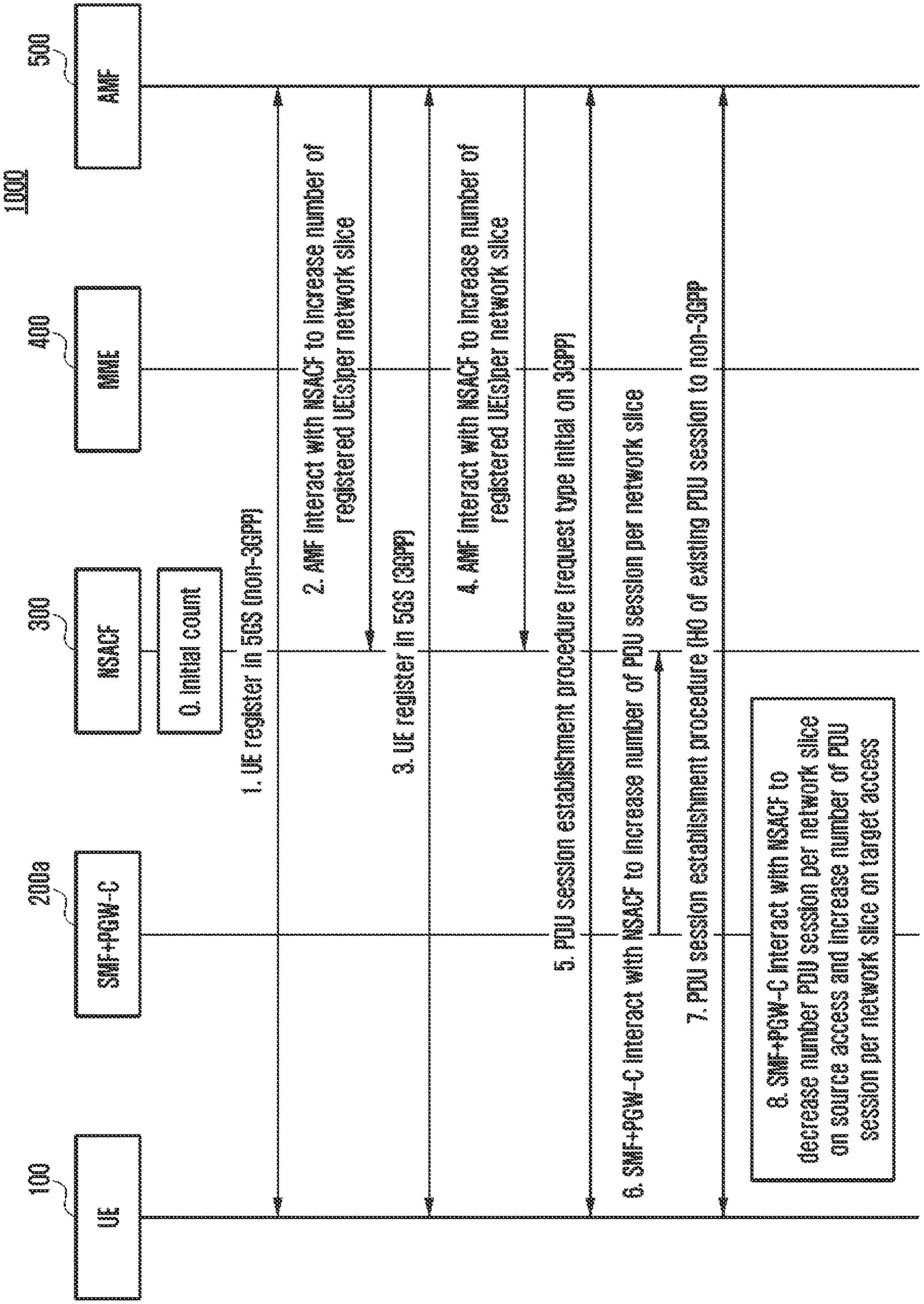
FIG. 3 depicts a scenario in which a handover of the PDU session occurs between a 3GPP to a non-3GPP, according to embodiments as disclosed herein.

FIG. 3 depicts an example scenario in which the handover of the PDU session occurs between the 3GPP to the non-3GPP, according to the embodiments as disclosed herein.

At step 1, the UE (100) registers in the 5GS (i.e., non-3GPP). At step 2, the AMF (500) interacts with the NSACF (300) to increase number of registered UE(s) per network slice. At step 3, the UE (100) registers in the 5GS (3GPP). At step 4, the AMF (500) interacts with the NSACF (300) to increase number of registered UE(s) per network slice. At step 5, the PDU session establishment procedure is done between the UE (100) and the AMF (500). At step 6, the SMF+PGW-C (200*a*) interacts with the NSACF (300) to increase number of PDU session per network slice. At step 7, the PDU session establishment procedure is done between the UE (100) and the AMF (500) the HO of existing PDU session to the non-3GPP. At step 8, if the SMF (200*b*) or the SMF+PGW-C (200*a*) determines that the PDU session is handed over from non-3GPP to 3GPP or 3GPP to non-3GPP (HO between 3GPP and non-3GPP with both the source and target access is on 5GS). The SMF (200*b*) or SMF+PGW-C (200*a*) interacts with the NSACF (300) to increases the number of PDU sessions per network slice for current access (target access) where PDU session is handover successfully. The SMF+PGW-C (200*a*) interacts with the NSACF (300) to decreases the number of PDU sessions per network slice for the access from where PDU session is handed over (source access). The SMF (200*b*) or SMF+P-GW stores the (Radio) access, where the PDU session is established. At the time of PDU session, the HO from one access to another access, the SMF (200*b*) or the SMF+PGW-C (200*a*) uses the stored information to determine source and target access.

Figure 4:
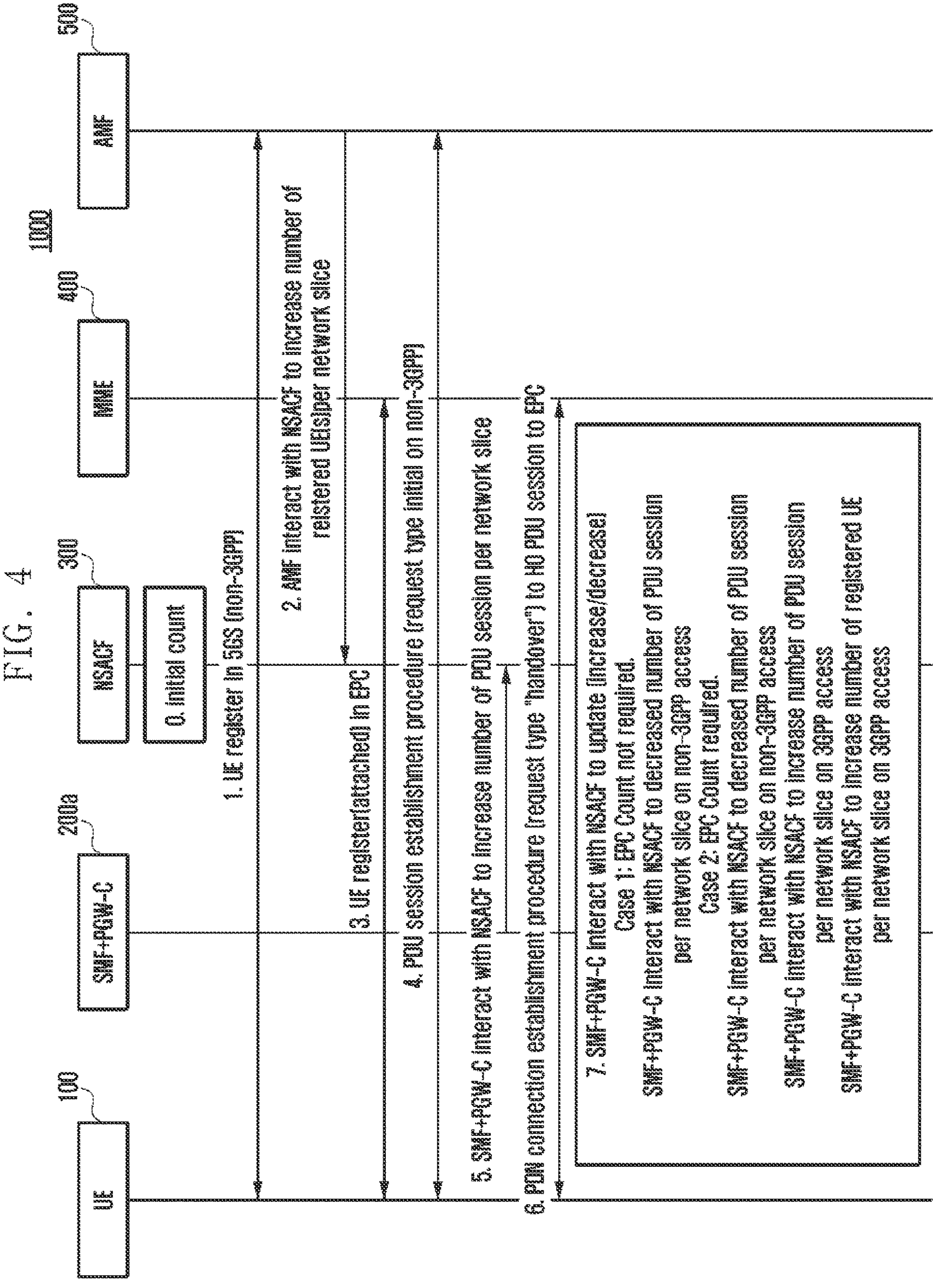
FIG. 4 depicts a scenario in which a handover of the PDU session occurs between a non-3GPP to an EPC, according to embodiments as disclosed herein.

FIG. 4 depicts a scenario in which the handover of the PDU session occurs between the non-3GPP and the EPC, according to the embodiments as disclosed herein. At step 1, the UE (100) registers in the 5GS (i.e., non-3GPP). At step 2, the AMF (500) interacts with the NSACF (300) to increase number of registered UE(s) per network slice. At step 3, the UE registers in the EPC. At step 4, the PDU session establishment procedure is performed between the UE (100) and the AMF (500). At step 5, the SMF+PGW-C (200*a*) interacts with the NSACF (300) to increase number of PDU session per network slice. At step 6, the PDN connection establishment procedure is performed between the UE (100) and the AMF (500) after the HO PDU session to the EPC.

At step 7, if the SMF (200*b*) or the SMF+PGW-C (200*a*) determines that the PDN connection is handed over to non-3GPP from the EPC. The SMF+PGW-C (200*a*) interacts with the NSACF (300) to update the number of PDU sessions and/or number of registered UE(s) per network slice as:

Case 1: if SMF+PGW-C (200*a*) is configured with "EPC Count not required".

1. The SMF+PGW-C (200*a*) interacts with the NSACF (300) to decrease the number of PDU sessions per network slice on the non-3GPP access.

Case 2: EPC count required:

1. The SMF+PGW-C (200*a*) interacts with the NSACF (300) to decrease the number of PDU sessions per network slice on non-3GPP access.
2. The SMF+PGW-C (200*a*) interacts with the NSACF (300) to increase the number of PDU session per network slice on 3GPP access.
3. The SMF+PGW-C (200*a*) interacts with the NSACF (300) to increase the number of registered UEs per network slice on 3GPP access.

The SMF (200*b*) or the SMF+P-GW (200*a*) stores the (Radio) access, where the PDU session is established. At the time of PDN connection HO from one access to another access, the SMF (200*b*) or the SMF+PGW-C (200*a*) uses the stored information to determine the source and target access (e.g., SMF store the (radio) access information as EPC,5GS 3GPP, 5GS non-3GPP).

Figure 5:
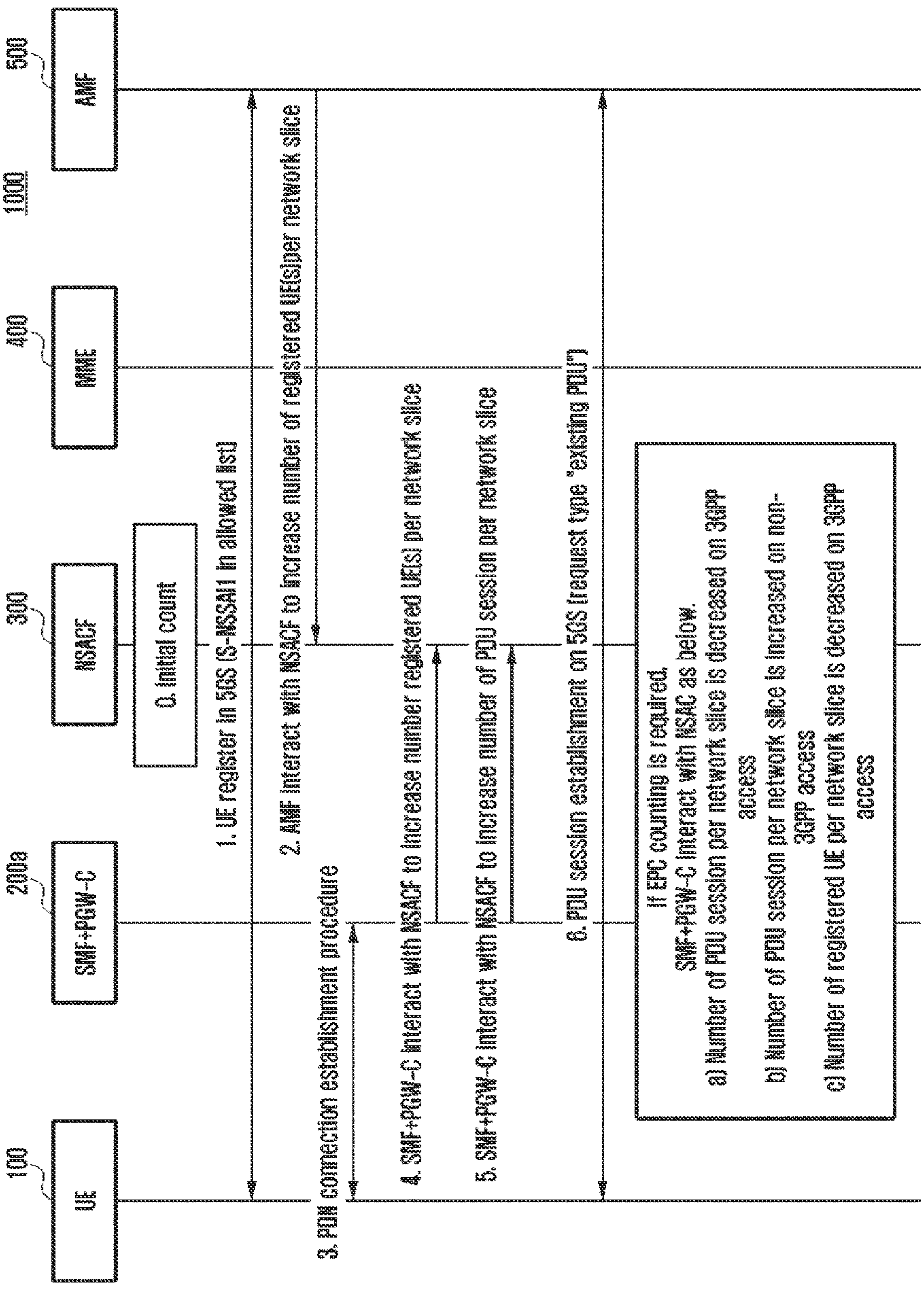
FIG. 5 depicts a scenario in which a handover of the PDN connection occurs from an EPC to a 5GC (non-3GPP), according to embodiments as disclosed herein.

FIG. 5 depicts a scenario in which the handover of the PDN session occurs from the EPC to the 5GC (non-3GPP), according to the embodiments as disclosed herein. At step 1, the UE (100) registers in the 5GS. At step 2, the AMF (500) interacts with the NSACF (300) to increase number of registered UE(s) per network slice. At step 3, the PDN connection establishment procedure is performed between the UE (100) and the SMF+PGW-C (200*a*). At step 4, the SMF+PGW-C (200*a*) interacts with the NSACF (300) to increase number registered UE(s) per network slice. At step 5, the SMF+PGW-C (200*a*) interact with the NSACF (300) to increase number of PDU session per network slice. At step 6, the PDU session establishment on the 5GS is performed between the UE (100) and the AMF (500).

If the SMF (200*b*) or the SMF+PGW-C (200*a*) determines that the PDN connection is handed over to the non-3GPP from the EPC, the SMF+PGW-C (200*a*) configured with the "EPC Counting required" interacts with the NSAC as below:

a. Decrease the number of PDU sessions per network slice on the 3GPP access.
b. Increase the number of PDU session per network slice on the non-3GPP access.

Decrease the number of registered UE per network slice on the GPP access.

Figure 6:
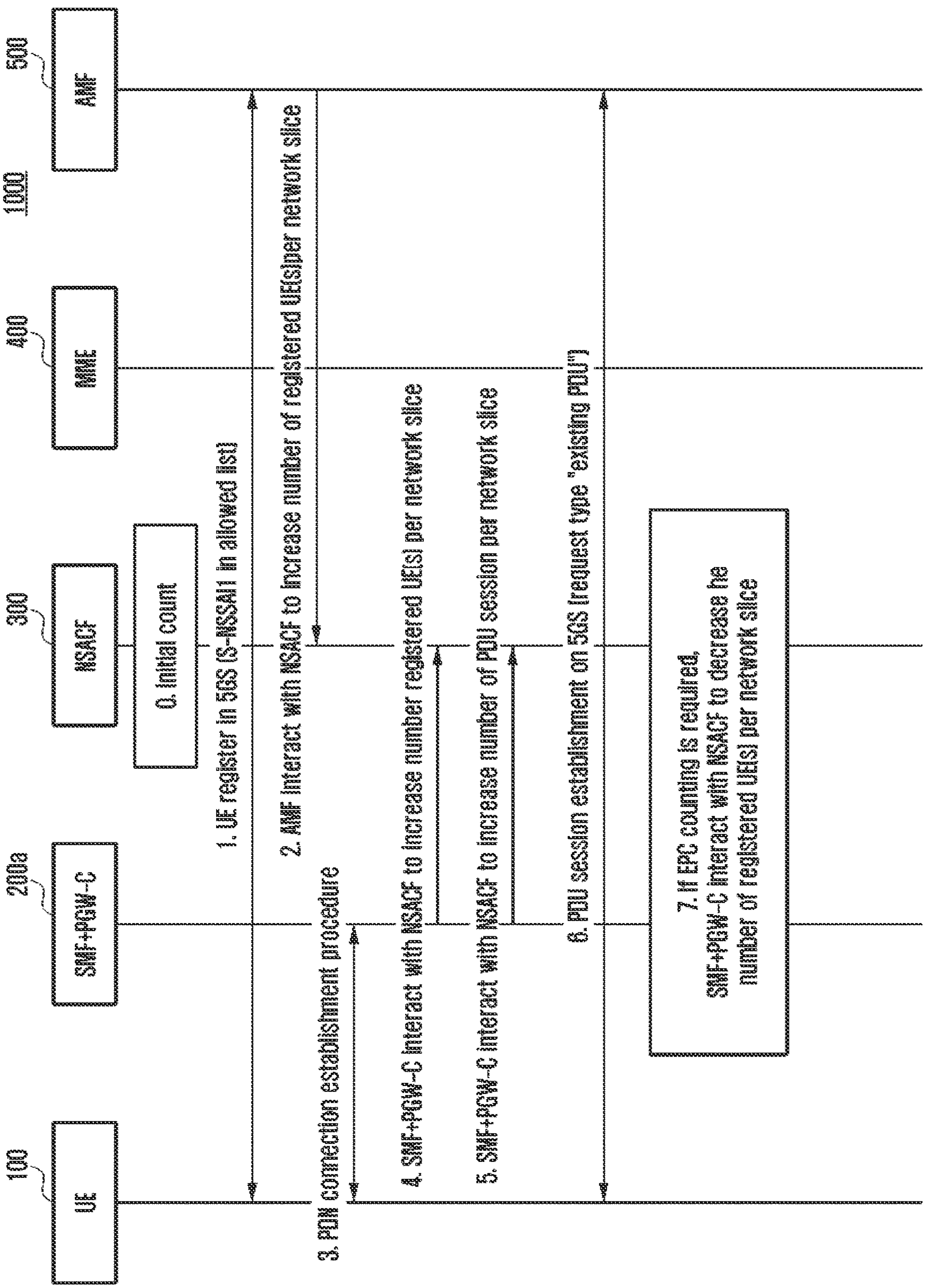
FIG. 6 depicts a dual-registration case in which the UE is simultaneously registered on the EPC and the 5GC, according to embodiments as disclosed herein.

FIG. 6 depicts a dual-registration case in which the UE (100) is simultaneously registered on the EPC and the 5GC, according to the embodiments as disclosed herein. At step 1, the UE (100) registers in the 5GS. At step 2, the AMF (500) interacts with the NSACF (300) to increase a number of registered UE(s) per network slice. At step 3, the PDN connection establishment procedure is performed between the UE (100) and the SMF+PGW-C (200*a*). At step 4, the SMF+PGW-C (200*a*) interact with the NSACF (300) to increase the number registered UE(s) per network slice. At step 5, the SMF+PGW-C (200*a*) interact with the NSACF (300) to increase the number of PDU session per network slice. At step 6, the PDU session establishment, on the 5GS, is performed between the UE (100) and the AMF (500). In step 7, if the EPC counting is required, the SMF+PGW-C (200*a*) interacts with the NSACF (300) to decrease the number of registered UE(s) per network slice or after step 6, if the SMF+PGW-C (200*a*) determined that the PDN connection is successfully handover to the 5GC (3GPP or non-3GPP), i.e., PDN connection with associated PDU session ID (PID1) is moved to other access, interact with NSACF (300) to decrease the number of registered UE(s) for the S-NSSAI (S-NSSAI1 in this case).

As per the proposed solution, the network slice admission control for the maximum number of UEs (100) and/or for maximum number of PDU sessions per network slice may not be performed at the time of PDN connection establishment for UE (100) not supporting N1 mode. The SMF+P-GWC (200*a*) can reject the PDN connection request, if the associated Access Point Name (APN) provided in the PDN connection request belongs to the network slice and the UE (100) has the N1 mode disabled. The SMF+PGW-C (200*a*) may identify the UE (100) not having N1 mode support either from the PDU session ID IE or 5QI IE value or any other N1 mode relevant IEs included during connection establishment request from UE (100).

Figure 7:
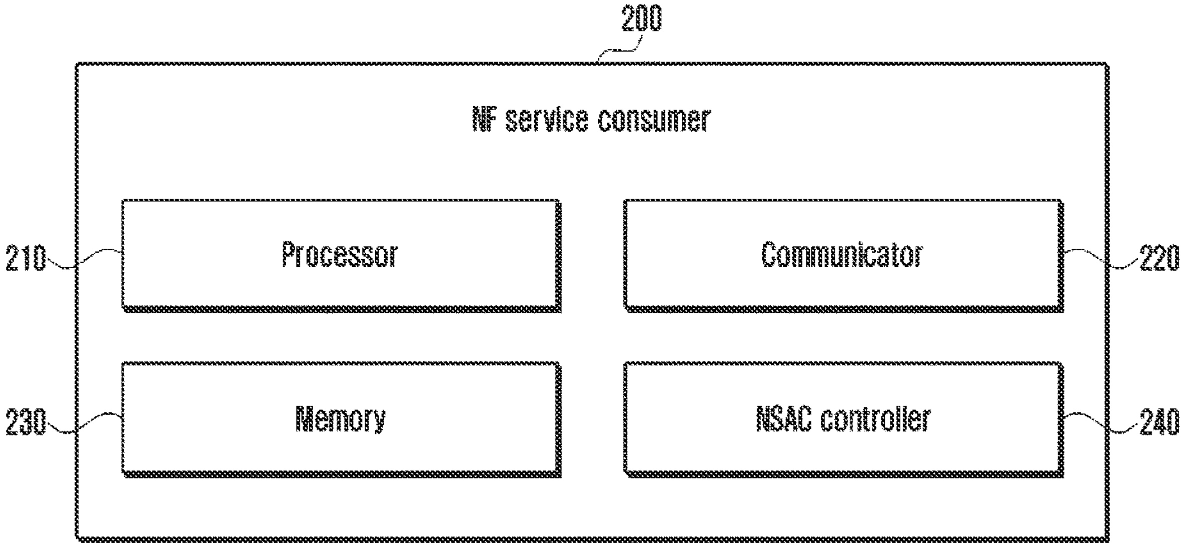
FIG. 7 shows various hardware components of a NF service consumer, according to the embodiments as disclosed herein.

FIG. 7 shows various hardware components of the NF service consumer (200), according to the embodiments as disclosed herein. The NF service consumer (200) can be, for example, but not limited to the SMF entity (200*b*) and the combined SMF and PGW-C (200*a*). In an embodiment, the NF service consumer (200) includes a processor (210), a communicator (220), a memory (230) and a NSAC controller (240). The processor (210) is coupled with the communicator (220), the memory (230) and the NSAC controller (240).

The NSAC controller (240) determines that the existing PDU session has been handed over from the source access to the target access. Further, the NSAC controller (240) updates the count at the source access and a count at the target access, based on the determination, by interacting the NF service consumer (200) with the NSACF entity (300). In an embodiment, the NSAC controller (240) decreases the number of PDU sessions per network slice at the source access and increases the number of PDU sessions per network slice at the target access upon determining the existing PDU session is handover from the source access to the target access. The source access and the target access is on a 5GS.

In an embodiment, the source access is the 3GPP access and the target access is the non-3GPP access. In another embodiment, the source access is the non-3GPP access and the target access is the 3GPP access.

The NSAC controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 7 shows various hardware components of the NF service consumer (200) but it is to be understood that other embodiments are not limited thereon. In other embodiments, the NF service consumer (200) may include less or more number of components. Further, the labels or names of the components are used only for illustrative purpose and does not limit the scope of the invention. One or more components can be combined together to perform same or substantially similar function in the NF service consumer (200).

Figure 8:
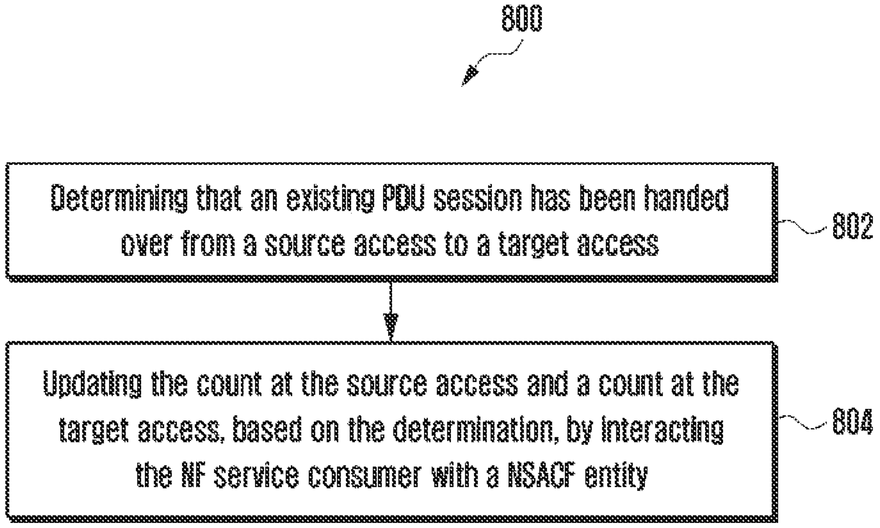
FIG. 8 is a flow chart illustrating a method for handling the NSAC in a wireless network, according to the embodiments as disclosed herein.

FIG. 8 is a flow chart (800) illustrating a method for handling the NSAC in the wireless network (1000), according to the embodiments as disclosed herein. The operations (802 and 804) are handled by the NSAC controller (240). At step 802, the method includes determining that the existing PDU session has been handed over from the source access to the target access. At step 804, the method includes updating the count at the source access and the count at the target access, based on the determination, by interacting the NF service consumer with the NSACF entity (300).

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method performed by a session management function (SMF) entity in a wireless network, the method comprising:

identifying that a handover of an existing protocol data unit (PDU) session between a source access and a target access is performed; and requesting a network slice admission control function (NSACF) entity to perform network slice admission control based on the handover of the existing PDU session, wherein a number of PDU sessions for the target access is increased and a number of PDU sessions for the source access is decreased based on the network slice admission control, and wherein the source access is a 3rd Generation Partnership Project (3GPP) access and the target access is a non-3GPP access, or the source access is the non-3GPP access and the target access is the 3GPP access.

2. The method of claim 1, wherein the existing PDU session is identified based on a PDU session identifier (ID).

3. The method of claim 1, wherein the SMF entity comprises a combined SMF and packet data network gateway control plane function (PGW-C).

4. A session management function (SMF) entity in a wireless network, comprising:

a processor;

a memory; and a controller, coupled with the processor and the memory, configured to:

identify that a handover of an existing protocol data unit (PDU) session between a source access and a target access is performed; and request a network slice admission control function (NSACF) entity to perform network slice admission control based on the handover of the existing PDU session, wherein a number of PDU sessions for the target access is increased and a number of PDU sessions for the source access is decreased based on the network slice admission control, and wherein the source access is a 3rd Generation Partnership Project (3GPP) access and the target access is a non-3GPP access, or the source access is the non-3GPP access and the target access is the 3GPP access.

5. The SMF entity of claim 4, wherein the existing PDU session is identified based on a PDU session identifier (ID).

6. The SMF entity of claim 4, wherein the SMF entity comprises a combined SMF and packet data network gateway control plane function (PGW-C).

* * * * *